United States Patent [19]

Kessler et al.

[11] Patent Number: 4,787,267
[45] Date of Patent: Nov. 29, 1988

[54] DIFFERENTIAL AXLE REDUCTION GEAR HOUSING

[75] Inventors: Thomas M. Kessler, Fort Wayne; Kraig J. Schlosser, Auburn, both of Ind.

[73] Assignee: Dana Corporation, Toledo, Ohio

[21] Appl. No.: 916,352

[22] Filed: Oct. 7, 1986

[51] Int. Cl.[4] .................. F16H 57/02; F16H 37/08
[52] U.S. Cl. .................. 74/606 R; 74/701; 74/607
[58] Field of Search .......... 74/606 R, 607, 713, 74/701

[56] References Cited

U.S. PATENT DOCUMENTS

| | | | |
|---|---|---|---|
| 921,522 | 5/1909 | Dunkel | 74/371 |
| 959,900 | 6/1909 | Sword | 74/344 |
| 1,139,674 | 5/1915 | Gruenfeldt | 180/57 |
| 1,169,072 | 1/1916 | Fawick | 74/378 |
| 1,230,450 | 6/1917 | Vincent | 74/713 |
| 1,420,995 | 6/1922 | Foote et al. | 74/701 |
| 1,431,958 | 10/1922 | Keim | 74/701 |
| 1,571,801 | 2/1926 | Rockwell | 74/694 |
| 2,608,261 | 8/1952 | Blazier | 180/70 |
| 2,701,972 | 2/1955 | Hoffman | 74/607 |
| 3,191,447 | 6/1965 | Ollman | 74/700 |
| 3,198,036 | 8/1965 | Muller | 74/710 |
| 3,381,769 | 5/1968 | Reisser | 180/22 |
| 3,522,861 | 8/1970 | Middlesworth et al. | 180/44 |
| 3,555,930 | 1/1971 | Boyd | 74/713 |
| 3,905,089 | 9/1975 | Osenbaugh et al. | 29/434 |
| 4,224,839 | 9/1980 | von Kaler | 74/701 |
| 4,232,569 | 11/1980 | Hauser et al. | 74/701 |

FOREIGN PATENT DOCUMENTS

| | | |
|---|---|---|
| 1071436 | 12/1959 | Fed. Rep. of Germany .... 74/606 R |
| 0237538 | 7/1986 | German Democratic Rep. ... 74/606 R |

Primary Examiner—Dirk Wright

[57] ABSTRACT

A one-piece axle housing contains an input shaft, an intermediate shaft, a differential gear assembly, and a pair of coaxially arranged axle shafts, all of which are aligned parallel to one another. The housing accommodates either a spur or helical gear system, preferably for small off-highway vehicles such as golf cars. In a preferred form, the unitary housing is die cast of aluminum and machined according to predetermined specifications. The input shaft is inserted through a motor side of the housing, and is retained by a snap ring. The intermediate shaft is next installed from the bottom of the housing, and the differential and axle shafts are lastly inserted into the housing, which is then closed by a steel cover. The input shaft, the intermediate shaft, and the axle shafts are maintained parallel to one another by the unitary housing which includes sets of aligned bores.

6 Claims, 1 Drawing Sheet

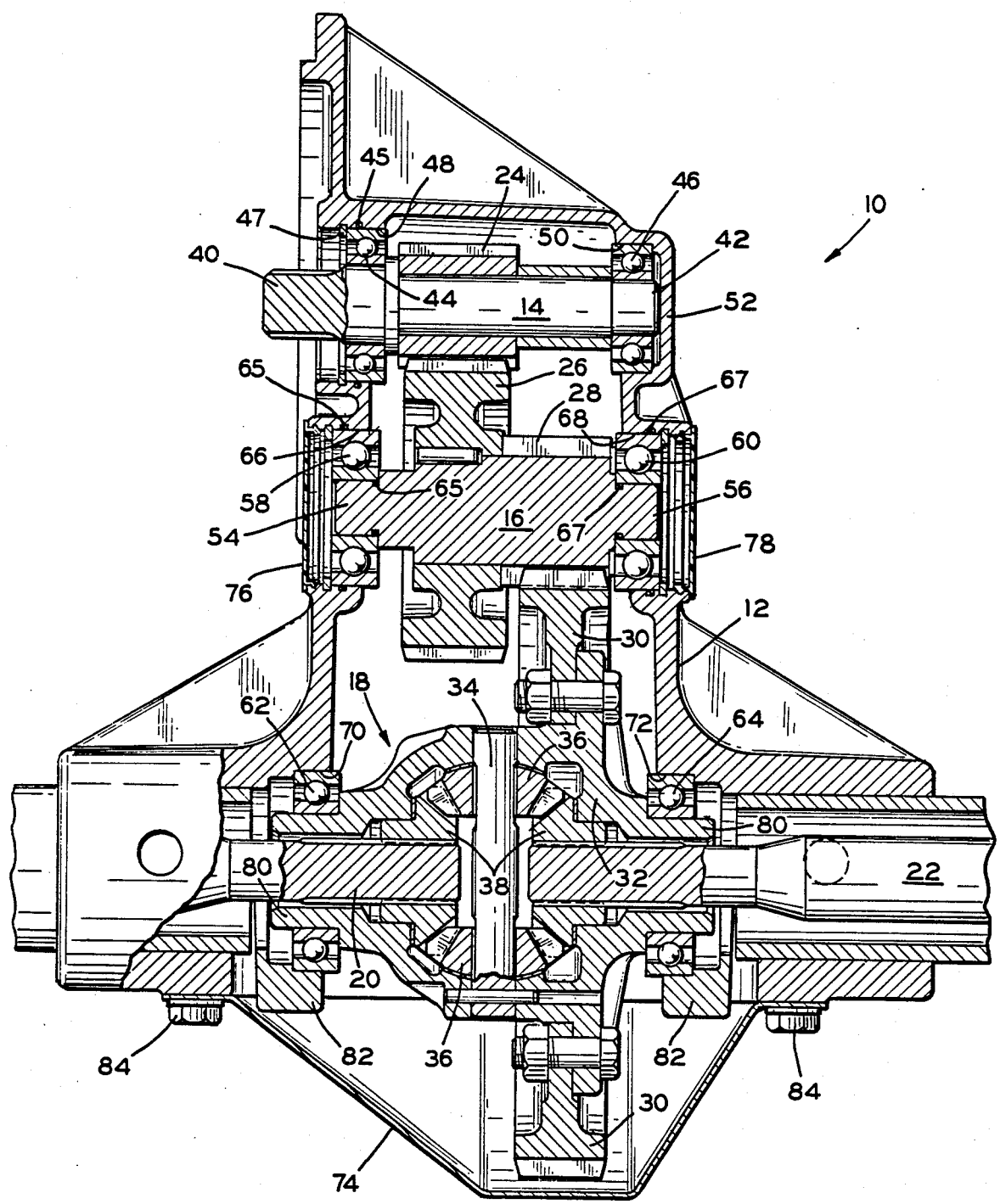

DIFFERENTIAL AXLE REDUCTION GEAR HOUSING

BACKGROUND OF THE INVENTION

This invention relates to reduction gears for light transport vehicles of the type generally powered by an electric motor or small gasoline engine. More particularly, the invention relates to construction of housings which contain spur or helical gearsets utilized in such reduction gear assemblies.

The problems inherent in maintaining "parallelism" or alignment of multiple parallel shafts are legion. In the prior art, utilization of parallel shafts in gear reduction systems has required two-piece housings, wherein each half is machined separately and then bolted together. Inherent in this practice is a slight mismatch of bearing bores due to tolerance accumulation in the separate machining processes. Additional costs are attributed to the use of two castings, machining steps, and extra assembly time required.

More desireable would be a unitary or one-piece design wherein bearing bores could be machined into a unitary housing, hence eliminating the above-mentioned bore mismatch problem. Also, use of a one-piece housing would eliminate any additional mismatch created in the bolting of the two halves together. The resultant accuracy would allow the gears on the parallel shafts to consistently run much closer to their ideal or theoretical positions, and as a result would improve the efficiency, durability and noise characteristics of the gear train operation. Such a one-piece housing would also have greater strength than the two-piece designs, in addition to utilizing fewer parts and requiring less labor in assembly.

SUMMARY OF THE INVENTION

The present invention provides a unitary or one-piece axle reduction gear housing which eliminates the above-identified problems of the prior art. As a result, the differential axle reduction gears which operate on parallel shafts run more efficiently and with greater durability and lower noise characteristics. In addition, the one-piece reduction gear housing provides a greater inherent strength than conventional two-piece housing designs.

In a preferred form, the unitary housing is constructed of a die cast aluminum, and is machined according to predetermined specifications. An input shaft is inserted through the motor side of the housing and is retained by a snap ring. An intermediate shaft is next installed through the bottom of the housing, and the differential gear set and axles are finally inserted. The housing is then closed by installation of a steel cover over its bottom. The input shaft, intermediate shaft, and differential axles are all maintained in a parallel relation to one another by the housing.

BRIEF DESCRIPTION OF THE DRAWING

The drawing figure is a cross-sectional view of a differential axle gear reduction apparatus which incorporates a preferred embodiment of the unitary housing of the present invention.

DETAILED DESCRIPTION OF A PREFERRED EMBODIMENT

A preferred embodiment 10 of the differential gear reduction assembly is shown in the drawing figure. The reduction assembly 10 includes a one-piece or unitary housing 12 which holds in parallel arrangement an input shaft 14, an intermediate shaft 16, and a differential assembly 18. The housing 12 is preferably formed of an aluminum alloy for the purpose of lightness of weight, a special consideration in the design of today's vehicles. Splined to the differential assembly 18 are a left axle shaft 20 and a right axle shaft 22 for transmission of rotary electromotive power to the wheels (not shown) of a small vehicle such as, for example, a golf car.

In the presently preferred embodiment of the gear reduction assembly 10, an input gear 24 is driven by a prime mover (not shown) which is coupled to the left end 40 of the input shaft 14. The input gear 24 is fixedly secured to the input shaft so as to rotate therewith. In one preferred form, the input gear 24 is, in fact, integral with the shaft 14. The gear 24 mates with an intermediate driven gear 26 secured to and rotatable with the intermediate shaft 16. In the preferred form, the relative sizes of the gears 24 and 26 are such that the gear 26 has a greater diameter, and hence the intermediate shaft 16 will rotate more slowly than the shaft 14. An intermediate pinion gear 28 is integral with the intermediate shaft 16. The gear 28 is mesh with a differential drive gear 30 which is secured to a differential case 32 of the differential assembly 18.

Rotation of the input shaft 16 is transferred through the input gear 24, the intermediate driven and pinion gears 26 and 28, and then to the differential drive gear 30, to thereby rotate the differential case 32 to produce conventional differential action of left and right axle shafts 20 and 22. For this purpose, the differential case contains a pinion shaft 34 which has a set of pinion gears 36 freely rotatable on the pinion shaft, and in mesh with a pair of side gears 38. The side gears 38 are splined to the axle shafts, and the axle shafts are thus positively driven thereby.

The preferred embodiment of the differential gear reduction assembly 10, as shown, incorporates several special accomodations related to the unitary housing 12. In the prior art, one piece housings have not been utilized for supporting more than two parallel shafts because of difficulties relating to assembly. Thus in the preferred form, the input shaft 14 is stepped in diameter, and includes a set of bearings having diameters which are not equal. More particularly, the right input shaft bearing 46, situated on the inboard or the right end 42 of the input shaft 14, is somewhat smaller than the left input shaft bearing 44, situated at the outboard or left end 40 of the input shaft. This accommodation permits the input shaft 14 to be installed by inserting the right end of the input shaft 42 into the left input shaft bearing bore 48 and moving rightwardly until the shaft is fully installed from the motor side of the unitary housing 12. For this purpose, the input gear 24 is also smaller than the left input shaft bearing bore 48 as well. The input shaft is retained by a snap ring 47. In the preferred embodiment, both input shaft bearings 44 and 46 provide slip fits into respective left and right bearing bores, 48 and 50, and are hence installed onto the input shaft 14 prior to insertion into the housing 12. An O-ring 45 seals the left input shaft bearing 44 against the perimeter of the left input shaft bearing bore 48 as shown.

The intermediate shaft 16 is next installed from the bottom of the housing, through an opening normally closed by an oil pan cover 74. The intermediate shaft is installed by tilting it, transporting it into a relative proper position inside of the housing, and then aligning it for parallel installation with respect to the input shaft 14. Left and right intermediate shaft bearings 58 and 60 are positioned onto the left and right ends or trunions 54 and 56 of the intermediate shaft from the outside of the housing 12. The left and right intermediate bearings are retained in place by snap rings 61 and 63, respectively. Intermediate shaft bearing seals 65 and 67 are installed between the bearings 58 and 60 and the intermediate shaft bearing bores 66 and 68, as well as in the interface between the latter bearings and the intermediate shaft 16.

The differential assembly 18 is next installed in a conventional manner, and includes bearings 62 and 64 situated in left and right differential case bearing bores 70 and 72, respectively.

It will also be noted that the right end 42 of the input shaft 14 is bounded by a housing closure 52 which is integral to the unitary housing 12, and hence necessitates that the input shaft be installed inwardly from the motor side of the housing 12 as described above. The left end 40 of the input shaft 14 extends through an opening in the motor side of the housing which is left uncovered.

The intermediate shaft has its left and right ends 54 and 56 bounded by optional protective snap-on covers 76 and 78, respectively. Upon installation of the differential assembly 18, which includes placing bearings 62 and 64 on the trunions 80 of the differential case 32, the case is bolted into place via bearing caps 82. The cover 74 is then fastened to the bottom of the housing 12 by means of bolts 84.

It will be appreciated by those skilled in the art that in the preferred embodiment, the input shaft bearings 44 and 46 are press fitted onto the input shaft 14, but for convenience provide slip fits into the housing bores of 48 and 50. The intermediate shaft bearings 58 and 60, on the other hand, accommodate slip fits to both the shaft 16 and the respective housing bores 66 and 68.

Also for convenience in the above-described preferred embodiment, the bearings 44, 58, and 60 are self-sealed, and hence, do not require an external lubrication source. This feature provides a more cost-effective seal against the external atmosphere to which the latter bearings are subjected, unlike the bearings 46, 62, and 64 which are internally encased.

Although only one preferred embodiment has been shown and described herein, the following claims are envisioned to cover numerous alternative embodiments not specifically mentioned herein.

What is claimed is:

1. In a differential gear reduction apparatus including a pair of coaxially arranged driving axle shafts, a vehicular differential assembly positioned coaxially between said axle shafts, said differential assembly including a differential drive gear positioned circumferentially about one of said axle shafts, and also positioned coaxially therewith, an input shaft disposed for rotary coupling to a prime mover, said input shaft parallel to said axle shafts and containing a first gear coaxially fixed thereon, an intermediate shaft positioned between said axle shafts and said input shaft, said intermediate shaft parallel to said axle shafts and said input shaft, said intermediate shaft including a second gear in mesh with said first gear, and said intermediate shaft including a third gear in mesh with said drive gear; an improvement comprising: a unitary structural housing containing said input and intermediate shafts, said differential assembly, and said axle shafts, said housing disposed for maintaining each of said input and intermediate shafts and said axle shafts parallel with respect to one another wherein said input shaft contains a stepped diameter wherein said input shaft defines an outboard and an inboard end of differently sized diameters, wherein the diameter of said outboard end thereof is larger than said inboard end diameter, wherein each of said differently sized ends is positioned in a correspondingly sized input shaft bearing bore in said unitary structural housing, said first gear being smaller than the outboard bearing bore of said housing.

2. The differential gear reduction apparatus of claim 1 wherein said inboard housing bore of said input shaft defines an integral closure.

3. The differential gear reduction apparatus of claim 2 wherein said intermediate shaft comprises an open bore at its outboard end, said open bore being disposed for receiving a cover plate.

4. The differential gear reduction apparatus of claim 3 wherein said bores within said housing adapted for accommodating said intermediate shaft are of substantially equal diameters.

5. The differential gear reduction apparatus of claim 4 further comprising an input bearing on each end of said input shaft, and an intermediate bearing on each end of said intermediate shaft, wherein said input bearings on said input shaft comprise slip fits between said bearings and said housing, and wherein said intermediate bearings on said intermediate shaft comprise slip fits between both said intermediate shaft and said housing.

6. A method of assembling a differential gear reduction apparatus, said apparatus including a housing having an opening positioned in a bottom portion thereof, a pair of coaxially supported driving axle shafts, a vehicular differential assembly positioned coaxially between said axle shafts, said differential assembly including a differential drive gear rotatably positioned circumferentially about one of said axle shafts and coaxially therewith, an input shaft disposed for rotary coupling to a prime mover, said input shaft parallel to said axle shafts and containing a first gear coaxially fixed thereto, an intermediate shaft positioned between said axle shafts and said input shaft and parallel with respect to said axle shafts and said input shaft, said intermediate shaft including a second gear in mesh with said first gear, said intermediate shaft further including a third gear in mesh with said drive gear, said input and intermediate shaft each supported in an inboard and an outboard bearing bore in said housing, said method comprising the steps of:

(a) installing said input shaft via insertion of its inboard end through the outboard bearing bore of said housing, and, (b) installing said intermediate shaft via insertion thereof into said bottom opening of said housing, holding said intermediate shaft in a tilted manner relative to said input shaft, transporting said intermediate shaft toward said input shaft, and then aligning said intermediate shaft parallel to said input shaft for installation of its respective ends into mating inboard and outboard bores.

* * * * *